United States Patent [19]

Miller

[11] 4,301,239
[45] Nov. 17, 1981

[54] ANTISTATIC BACKING LAYER FOR UNSUBBED POLYESTER FILM

[75] Inventor: Conrad E. Miller, Hendersonville, N.C.

[73] Assignee: E. I. Du Pont de Nemours and Company, Wilmington, Del.

[21] Appl. No.: 100,520

[22] Filed: Dec. 5, 1979

[51] Int. Cl.³ .............................................. G03C 1/78
[52] U.S. Cl. .................................. 430/510; 430/517; 430/527; 430/532; 430/533; 430/536
[58] Field of Search ............... 430/510, 517, 527, 531, 430/532, 533, 536

[56] References Cited

U.S. PATENT DOCUMENTS

| | | | |
|---|---|---|---|
| 2,327,828 | 8/1943 | Simmons | 430/513 |
| 3,072,483 | 1/1963 | Trevoy et al. | 96/87 |
| 3,525,621 | 8/1970 | Miller | 430/533 |
| 3,704,167 | 11/1972 | Yamamoto et al. | 430/510 |
| 3,753,765 | 8/1973 | Morgan et al. | 430/496 |
| 4,181,528 | 1/1980 | Work et al. | 430/532 |

*Primary Examiner*—Jack P. Brammer

[57] ABSTRACT

Dimensionally stable energy-treated polyester film is coated with an opaque antistatic backing layer of carbon-filled polyacrylate containing an aziridine crosslinking agent.

9 Claims, 1 Drawing Figure

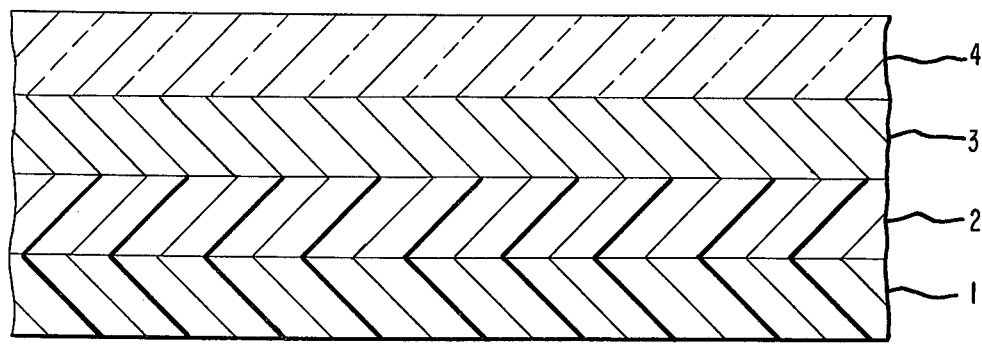

ANTISTATIC BACKING LAYER FOR UNSUBBED POLYESTER FILM

BACKGROUND OF THE INVENTION

1. Field of the Invention

This invention relates to antistatic layers applied to hydrophobic organic polymer films, especially photographic polyester film intended for use as a support for photographic film.

2. Background Art

Photographic films, in which a silver halide emulsion is coated on a polyester film support, have a high dielectric constant, and tend to develop static charges when they move in contact with surfaces of similar high dielectric constant. As a result, they can become fogged by the light generated by static discharge, even though this is not visible to the naked eye or easily detected by instrumentation.

U.S. Pat. No. 2,327,828 "Colloidal Carbon Antihalation Layer" (1943) discloses applying a plastic coating containing a carbon pigment to a film support for a photographic emulsion in order to decrease the buildup of static charges. U.S. Pat. No. 3,072,483 "Photographic Element Comprising Polyethylene Terephthalate Film Base" (1963) and U.S. Pat. No. 3,753,765 "Conductive Carbon Antistatic Backing for Photographic Film" (1973) disclose applying to an energy-treated polyester film support, preferably polyethylene terephthalate, a layer of an antistatic composition coated from an aqueous dispersion of an acrylic binder; in the case of U.S. Pat. No. 3,753,765 the binder may also contain carbon black. Inasmuch as polyester films, such as polyethylene terepthalate films, present a hydrophobic surface, the usual practice is to apply an intermediate "subbing layer" to the polyester surface in order to effect good adhesion between it and the antistatic coating. The subbing layer is, typically, a chlorine-containing copolymer resin coating which is applied to the polyester film support after the latter has been cast into film but before it has been stretched in two directions to obtain the desired biaxial orientation, and then heat set.

The trouble with this practice is that a certain amount of scrap film is formed in the process of biaxial orientation and heat setting of the polyester film, and it cannot be recycled because the subbing layer has already been applied, and is incompatible with the composition of the molten polyester. This prevents recycle of the scrap polyester film unless the subbing layer is removed beforehand, and its removal is costly and difficult, making this undesirable. As a result much film has to be discarded instead of being recycled. The present invention provides a solution to this problem.

SUMMARY OF THE INVENTION

The invention is in an article of manufacture comprising a dimensionally stable energy-treated film support coated, post-stretch, with an opaque antistatic backing layer, characterized in that the backing layer is applied from an aqueous dispersion of a carbon-filled film-forming polymer containing free carboxyl groups, in admixture with an aziridine cross-linking agent. It is believed that when the backing layer is cured the aziridine cross-links the polymer and also firmly bonds it to the energy-treated polyester film support. This eliminates the need for a conventional subbing layer. As a result, scrap polyester film formed during the stretching step can now be recycled, since the antistatic backing layer of this invention will not have been applied as yet. In addition, overall coating quality is improved, and the cost of manufacture is reduced by the elimination of one coating step.

DETAILED DESCRIPTION OF THE INVENTION

The article of manufacture of this invention is made by a simple procedure. In one embodiment, an aqueous dispersion of an antistatic backing layer consisting essentially of a carbon-filled film-forming polymer containing carboxyl groups, in admixture with an aziridine cross-linking agent, is coated on a film support such as polyethylene terephthalate film which has been extruded, stretched and heat set to achieve biaxial orientation and dimensional stability, and energy-treated, e.g., by electrostatic, flame, or chemical treatment. Such energy treatment is conventional in the art; patents which illustrate such terms are U.S. Pat. Nos. 2,493,937; 3,072,483; 3,607,818, 3,753,765; and Canadian Pat. No. 684,658.

In an exemplary procedure for achieving dimensional stability, a molten polyester, polyethylene terephthalate, is cast or extruded onto a suitable smooth surface and stretched longitudinally or laterally, in either order or simultaneously, at a temperature of of about 70° C. to 120° C., heat-set at a temperature of about 150° C. to 210° C., and then heat-relaxed at a temperature of about 110° C. to 150° C. for a period of 1 to 3 minutes under slight tension, whereby internal stresses are relaxed.

In another embodiment the aforesaid aqueous dispersion is coated on a polyolefin surface, e.g., polyethylene-clad paper, at least one surface of which has been similarly energy-treated. Upon heating, the antistatic coating composition is firmly bonded to the support.

This invention provides a permanent hydrophobic antistatic layer particularly useful for photographic film. The term "permanent" means that the antistatic layer will retain its effective electrical conductivity after it has been processed in photographic developers, fixers, and wash solutions. This is especially important where machine processing is used, which involves elevated solution temperatures and hot air drying. "Hydrophobic" means that the antistatic layer is not water-soluble or water-swellable. The invention also provides an antistatic layer which can be applied readily from a water dispersion to avoid the environmental hazards and greater expense involved with solvent coatings, e.g., the need for expensive solvent recovery. Since the antistatic layer must contain (for the purposes of this invention) a very high level of carbon black, and since this can only be achieved by aqueous disperson, it is surprising that it will adhere to a very hydrophobic polyester film.

The accompanying FIGURE forms a material part of this disclosure and is a cross-sectional view of a photographic film made in accordance with the present invention.

Referring to the drawing: a film base comprising a sheet 2 of, for example, polyethylene terephthalate, which has been energy-treated on one side, is coated with a backing layer 1 comprising carbon black, an aziridine, and a film-forming polymer containing carboxyl groups, e.g., a polyacrylate, which is cross-linked to functional groups in the energy-treated base by the aziridine; a gelatin-containing intermediate substratum 3; and a photosensitive gelatino-silver halide emulsion layer 4. One aspect of the invention resides in the improved anchorage contributed by the aziridine acting as a cross-linking agent between the film base 2 and the opaque backing layer 1.

Referring to the composition of backing layer 1: while the preferred aziridine is pentaerythritol-tri-[β-(N-aziridinyl)-propionate],

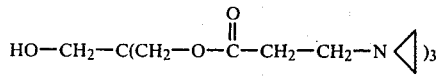

others which can be employed include not only trimethylolpropane-tri-[β-(N-aziridinyl)-propionate]

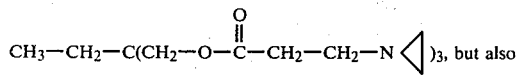, but also trimethylolpropane-tri-[β-(N-methylaziridinyl) propionate]

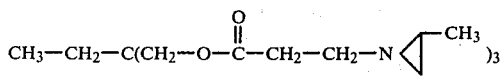

and any others that are reasonably soluble and stable in water, that contain at least two aziridine groups in order to effect cross-linking, and, in the backing layer of this invention, will effect a rapid and complete cure at the temperatures at which the backing layer is cured after it has been applied to the support, e.g., about 130° C. in a time span of about one minute. These are commonly referred to as "polyfunctional" aziridines.

The aziridine should be used in proportions of about 2–7% by weight, preferably about 3%, based on the dry weight of the polyacrylate.

The film-forming polymer component of the backing layer must contain carboxyl groups to provide the necessary cross-linking sites. One group of polymers which is most effective with aziridines comprises polyacrylates containing carboxyl groups, e.g., copolymers of methacrylic acid. As a general class the most effective polyacrylates are methyl methacrylate (50–66% by weight)/ethyl acrylate (29–45% by weight)/methacrylic acid (about 5% by weight) terpolymers. However, the carboxylated monomer can be employed in amounts as low as 1–2% by weight. (Percentages by weight are based on the weight of the terpolymer.) Other lower alkyl acrylates such a methyl and butyl acrylates may be used instead of ethyl acrylate. Also, polyacrylic acid may be employed. The antistatic backing layer should contain 0.25–0.50 parts by weight of a low resistivity carbon black per part of said terpolymer.

Referring to the drawing, the polyester support 2 may be composed of any film-forming polyester of a dicarboxylic acid and a dihydric alcohol of the type described in Alles U.S. Pat. No. 2,779,684 "Polyester Films and Their Preparation" (1957) and the patents referred to therein. Other suitable supports are the polyethylene terephthalate/isophthalates of British Pat. No. 766,290 and Canadian Pat. No. 562,672 and those obtainable by condensing terephthalic acid and dimethyl terephthalate with propylene glycol, diethylene glycol, tetramethylene glycol or cyclohexane 1,4-dimethanol (hexa-hydro-p-xylene alcohol). The films of Bauer et al, U.S. Pat. No. 3,052,543 "Photographic Film Base and Film" (1962) may be used. The above polyester supports are particularly suitable because of their dimensional stability. The support 2 may also be so-called polyclad paper, i.e., a sheet of paper coated with polyethylene on both sides.

It is believed that energy treatment of the support 2 by, e.g., electrostatic, chemical, or flame treatment on the side to which the backing layer is to be applied creates active sites on the base surface, believed to be carboxyl groups. It is believed that each of these in turn reacts with, and couples to, one of the aziridine groups of the aziridine molecule, and that the other aziridine group or groups cross-link to the backing layer. The latter can be applied to support 2 by any conventional coating technique, e.g., skim, bar, curtain and extrusion coating; followed by drying and thermal curing to effect the desired adhesion.

The intermediate gelatin-containing substratum 3 is coated over the energy-treated support 2 and in turn coated with layer 4. The latter is a conventional gelatino-silver halide emulsion system, e.g., gelatino-silver bromide, chloride, iodide, or mixtures of these. The silver halide emulsion can, of course, contain dyes, sensitizers, binders, and other additives conventional in the photographic art. It is not essential that the support 2 be energy-treated on the side to which substratum 3 is applied; it is essential that it be energy-treated on the side to which the backing layer is to be applied.

The invention is illustrated by the following Examples.

EXAMPLE 1

The following ingredients were mixed to provide a slurry for use in preparing an antistatic backing layer:

| Ingredient | Amount (g) |
| --- | --- |
| Distilled water | 200.0 |
| Poly(methylmethacrylate/ethylacrylate/methacrylic acid)66/29/5, 30% in water, Elvacite ® 9013[1] | 57.0 |
| Carbon black (Aquablack ® -15[2], 32.5% in water) | 21.0 |
| Fluorosurfactant (FC-128 ®[3] - 5% in water); Formula: $C_xF_{2x+1}SO_2-N(CH_3)-CH_2-COOH$ | 0.2 |
| Aziridine cross-linking agent: Trimethylolpropane tri-[β-(N-aziridinyl) propionate] | 1.7 |

[1] Sold by E. I. du Pont de Nemours & Co. (Inc.), Wilmington, DE
[2] Sold by Borden Chemical Co., Cincinnati, Ohio
[3] Sold by 3M Co., Minneapolis, MN These ingredients were thoroughly mixed and blended at about 25° C. and the pH adjusted to about 9.7 with aqueous ammonium hydroxide. The weight % solids was about 8.6.

A sample of 4 mil polyethylene terephthalate film base, having sufficient carbon black (particle size of 0.05 to 1.0 micron) dispersed therein to give an optical density of about 8 measured with a Polaroid Opacity Monitor, was biaxially oriented and heat set at 195°–205° C., and heat-relaxed at 110°–130° C. to improve dimensional stability. The surface of this film was then energy-treated on one side with an oxidizing flame (propane flow 0.9 SCFM, oxygen flow 1.36 SCFM, and air flow 11.3 SCFM with a web speed of 200 feet/min.). The slurry prepared above was then coated on the energy-treated surface with a 2 mil doctor knife. The coating was air dried at about 90° C. for about 5-6 minutes, and the film was then heat relaxed in a convection oven at 100°-105° C. for 90 seconds. The surface resistivity of the dried coating was measured as $1.4 \times 10^5$ ohms per square, indicating that the coating serves as a good antistatic layer.

Anchorage of the resulting coating was measured as follows:

Dry Anchorage:
1. Scribe $\frac{1}{4}'' \times \frac{1}{4}''$ square hatch marks in coating with a razor blade.
2. Place a 1" sample of No. 600 Scotch Brand Tape (3M Co., Minneapolis, MN) over the scribed areas and rub to insure complete contact.
3. Pull tape quickly from surface at about 30° with an even pull.
4. Count number of squares and partial squares removed.

Wet Anchorage:
1. Place sample of backing against wet photographic emulsion layer (unexposed, e.g., Polacolor®-2, Polaroid Co., Cambridge, MA).
2. Allow to set approximately 8 hours.
3. Strip apart and examine for evidence of backing pick-off on emulsion surface. None can be tolerated.

The anchorage, both wet and dry, of the backing layer of this invention was found to be "excellent". In neither case was there any evidence of release from the film base support. On the other hand, a sample made without the cross-linking agent failed the wet anchorage test and one similar to the invention but coated on polyethylene terephthalate which was not energy-treated failed both wet and dry tests.

EXAMPLE 2

Five (5) separate slurries, useful in preparing antistatic backing layers, were prepared as follows:

| Ingredient | Amount Used (g) | | | | |
|---|---|---|---|---|---|
| | A | B | C | D | E |
| Dist. water | 2480 | 2480 | 2480 | 2480 | 2480 |
| Carbon black (Ex. 1) | 300 | 300 | 300 | 300 | 300 |
| Elvacite® 9013 (Ex. 1) | 780 | 780 | 780 | — | — |
| Fluorosurfactant (Ex. 1) | 42 | 42 | 42 | 42 | 42 |
| Poly(styrene/butyl-methacrylate/-butylacrylate/-acrylic acid) 43/45/4/8)(1) | — | — | — | 563 | 563 |
| Aziridine (Ex. 1) | — | 23 | — | 23 | — |
| Aziridine: trimethylolpropane tri-[β-(N-methyl-aziridinyl) propionate] | — | — | 23 | — | — |

(1)Rhoplex® WL-81 sold by Rohm & Haas, Philadelphia, PA

In each sample the ingredients were thoroughly mixed, the pH adjusted to 9.5±0.5, with aqueous ammonium hydroxide, and the aziridine cross-linking agents added to the solutions just prior to coating. The slurries were used to coat the same film base in the same manner as described in Example 1. In addition to wet and dry anchorage tests, each coated and dried sample was tested for its resistance to organic solvents by immersing a 1 in.×3 in. strip in a beaker of solvent and allowing it to soak about 2 minutes. The strips were then removed, the excess solvent removed by a squeegee, and the coatings examined to see if the solvent had caused delamination from the energy-treated film supports. The solvents used in this test were methyl ketone, methyl iso-butyl ketone, ethyl acetate, cyclohexane, 1,2-dichloroethane, tetrachloroethane, tetrahydrofuran, and methylene chloride. The following results were achieved:

| SAMPLE | WET ANCHORAGE | DRY ANCHORAGE | SOLVENT RESISTANCE |
|---|---|---|---|
| A | Failed | Slight failure | Poor |
| B | Good | Good | Good |
| C | Good | Good | Good |
| D | Good | Good | Good |
| E | Failed | Slight failure | Poor |

This example demonstrates that it is necessary to use a cross-linking agent and that several polyacrylates and cross-linkers will function within the ambit of the invention.

EXAMPLE 3

The following slurries were prepared:

| Ingredient | Amount Used (g) | | | |
|---|---|---|---|---|
| | A | B | C | D |
| Dist. water | 200 | 200 | 200 | 200 |
| Carbon black (Ex. 1) | 21.4 | 21.4 | 21.4 | 21.4 |
| Elvacite® 9013 Fluorosurfactant | 56.4 | 56.4 | 56.4 | 56.4 |
| (Ex. 1) | 0.4 | 0.4 | 0.4 | 0.4 |
| Toluene sulfonic acid catalyst (1% in H$_2$O) | 0.6 | 0.3 | 1.2 | — |
| Melamine-formaldehyde resin cross-linker(1) in weight % Based on Elvacite® | 2.8 / 5 | 1.4 / 2.5 | 5.6 / 10 | — / 0 |

(1)Cymel® 303, Sold by American Cyanamid, N.Y., NY

These slurries were then coated on energy-treated, carbon-filled polyethylene terephthalate film supports and air dried and heat relaxed, and given a wet anchorage test, as described in Example 1. All samples failed, indicating that the melamine-formaldehyde resin will not cross-link sufficiently at the curing temperature of the aziridines.

EXAMPLE 4

To demonstrate the utility of the polyacrylate backing layer of Example 1 on other supports the slurry of Example 1 (ca. 9% solids) was adjusted to 2.5% solids by dilution with distilled water. A paper support supplied by Schoeller Photo Papers, Inc., Pulaski, NY was used. This product is essentially a paper which is coated on both sides with polyethylene layers A and B. Layer A is a low density polyethylene containing 15% by weight TiO$_2$, at a coverage of 26 mg/m$^2$. Layer B is high density polyethylene containing 10% by weight of carbon black, at a coverage of 30 g/m$^2$. The paper is 3.3 mil thick (94 g/m$^2$) and contains carbon black and NaCl as described in U.S. Pat. No. 3,758,376 "Opaque Papers and Photographic Papers Prepared Therefrom" (1973). The surfaces of Layer A and Layer B were given an electrical discharge treatment and the above referenced slurry was coated on Layer B at about 1.0 to 1.5 g/m$^2$ coating weight to provide an antistatic layer. A pan-sensitized, negative-working gelatino-silver iodobromide (6% silver iodide) emulsion was coated (1.0 g Ag/m$^2$) over the surface of Layer A and a gelatin overcoat (1.1 g/m²) coated contiguous thereto. The antistatic layer had a surface resistivity of $1\times 10^7$ ohms per square, indicating good antistatic properties, and did not separate from Layer B during handling, exposure and processing of the emulsion layer.

While Example 4 employed polyethylene-clad paper, it is within the scope of the invention to use polyethylene film per se as a support, as well as other polyolefin films such as polypropylene and polybutylene. Energy treatment of these film surfaces will create active sites thereon, including carboxyl groups.

I claim:

1. An article of manufacture consisting of a dimensionally stable energy-treated film base coated on one side with an opaque antistatic backing layer, characterized in that the backing layer is applied from an aqueous dispersion of a carbon-filled film-forming polyacrylate containing free carboxyl groups, in admixture with a polyfunctional aziridine cross-linking agent, followed by drying and thermal curing and a silver halide emulsion layer coated on the opposite side of the film base.

2. The article of claim 1 wherein the film-forming polyacrylate is a terpolymer of methyl methacrylate, ethyl acrylate, and methacrylic acid.

3. The article of claim 1 wherein the film-forming polyacrylate is poly(styrene/butylmethacrylate/butylacrylate/acrylic acid).

4. The article of claim 1 wherein the film base is a biaxially oriented heat set polyethylene terephthalate.

5. The article of claim 1 wherein the film base is a polyolefin.

6. The article of claim 1 wherein the film base is polyethylene-clad paper.

7. An energy-treated, biaxially oriented polyester film base having adhered to one side thereof a silver halide emulsion layer and having adhered to the opposite side thereof a layer of an opaque antistatic backing layer coated, post-stretch, from an aqueous dispersion comprising
   a. a terpolymer of the following composition
      1. 50 to 66 percent by weight of methyl methacrylate,
      2. 29 to 45 percent by weight of ethyl acrylate
      3. about 5 percent by weight of methacrylic acid
   b. a polyfunctional aziridine
   c. from 0.25 to 0.50 parts by weight of carbon black per part of terpolymer.

8. An energy-treated polyethylene-clad paper support having adhered to one side thereof a silver halide emulsion layer and having adhered to the opposite side thereof a layer of an opaque antistatic backing layer coated from an aqueous dispersion comprising
   a. a terpolymer of the following composition
      1. 50 to 66 percent by weight of methyl methacrylate,
      2. 29 to 45 percent by weight of ethyl acrylate
      3. about 5 percent by weight of methacrylic acid
   b. a polyfunctional aziridine
   c. from 0.25 to 0.50 parts by weight of carbon black per part of terpolymer.

9. A method of preparing a photographic film in which a silver halide emulsion layer is coated on a polyethylene terephthalate film base comprising:
   a. extruding the film base, stretching it in two directions and heat-setting,
   b. energy treating one side of the film base, and then coating it with an antistatic backing layer comprising a carbon-filled methyl methacrylate-ethyl acrylate-methacrylic acid copolymer and a polyfunctional aziridine,
   c. heating the coated film base for a time and at a temperature sufficient to bond the copolymer thereto, and
   d. coating the opposite side of the film base with a gelatino-silver halide emulsion.

* * * * *